(12) United States Patent
Ronning (10) Patent No.: US 6,804,707 B1
(45) Date of Patent: Oct. 12, 2004

(54) METHOD AND SYSTEM FOR DELIVERING WIRELESS MESSAGES AND INFORMATION TO PERSONAL COMPUTING DEVICES

(76) Inventor: Eric Ronning, 4324 W. 87th St., Prairie Village, KS (US) 66207

( * ) Notice: Subject to any disclaimer, the term of this patent is extended or adjusted under 35 U.S.C. 154(b) by 690 days.

(21) Appl. No.: 09/693,489

(22) Filed: Oct. 20, 2000

(51) Int. Cl.$^7$ ............................................. G06F 15/177
(52) U.S. Cl. ........................ 709/220; 709/225; 709/226; 709/227; 709/229
(58) Field of Search ................................ 709/225, 226, 709/227, 229, 246, 220

(56) References Cited

U.S. PATENT DOCUMENTS

| | | | |
|---|---|---|---|
| 5,680,551 A | | 10/1997 | Martino, II |
| 6,006,332 A | * | 12/1999 | Rabne et al. ................ 713/201 |
| 6,049,796 A | * | 4/2000 | Siitonen et al. ................ 707/3 |
| 6,052,735 A | * | 4/2000 | Ulrich et al. ................ 709/236 |
| 6,073,165 A | * | 6/2000 | Narasimhan et al. ........ 709/206 |
| 6,122,671 A | * | 9/2000 | Farrar et al. ................ 709/238 |
| 6,125,281 A | | 9/2000 | Wells et al. |
| 6,148,068 A | * | 11/2000 | Lowery et al. ......... 379/202.01 |
| 6,148,336 A | * | 11/2000 | Thomas et al. ............. 709/224 |
| 6,216,152 B1 | * | 4/2001 | Wong et al. ................. 709/203 |
| 6,219,694 B1 | | 4/2001 | Lazaridis et al. |
| 6,240,459 B1 | * | 5/2001 | Roberts et al. ............. 709/232 |
| 6,300,947 B1 | * | 10/2001 | Kanevsky .................... 345/866 |
| 6,421,708 B2 | * | 7/2002 | Bettis ......................... 709/206 |
| 6,424,828 B1 | * | 7/2002 | Collins et al. ........... 455/412.1 |
| 6,442,589 B1 | * | 8/2002 | Takahashi et al. .......... 709/203 |
| 6,449,635 B1 | * | 9/2002 | Tilden et al. ................ 709/206 |
| 6,463,462 B1 | * | 10/2002 | Smith et al. ................. 709/206 |
| 6,473,609 B1 | * | 10/2002 | Schwartz et al. ........... 455/406 |
| 6,487,599 B1 | * | 11/2002 | Smith et al. ................. 709/229 |
| 6,553,375 B1 | * | 4/2003 | Huang et al. .................. 707/10 |
| 6,604,140 B1 | * | 8/2003 | Beck et al. .................. 709/226 |
| 6,611,358 B1 | * | 8/2003 | Narayanaswamy ......... 358/442 |
| 6,643,506 B1 | * | 11/2003 | Criss et al. .................. 455/419 |
| 6,701,521 B1 | * | 3/2004 | McLlroy et al. ............. 717/173 |
| 6,707,581 B1 | * | 3/2004 | Browning .................... 358/473 |

* cited by examiner

Primary Examiner—Saleh Najjar
(74) Attorney, Agent, or Firm—Hovey Williams LLP (57) ABSTRACT

A method and system for pushing information to personal computing and communication devices operated by users in such a way that the users can use and/or act upon the information even when the users are off-network or off-line. The method and system also automatically "provisions" the personal computing and communication devices so that the devices may be used to act upon the information that is pushed to the devices.

26 Claims, 1 Drawing Sheet

METHOD AND SYSTEM FOR DELIVERING WIRELESS MESSAGES AND INFORMATION TO PERSONAL COMPUTING DEVICES

BACKGROUND OF THE INVENTION

1. Field of the Invention

The present invention relates to wireless communications. More particularly, the invention relates to a method and system for automatically pushing wireless messages and other information to personal computing and communication devices such as personal digital assistants.

2. Description of the Prior Art

The market for wireless communication services has grown dramatically in the past few years and is expected to grow at an even faster rate in the future. Many experts predict that wireless communication services will soon surpass traditional "wired" methods of communication. Wireless communication services are no longer limited to voice traffic, but instead now include voice and data traffic so that all types of messages and information can be wirelessly transmitted to and from mobile devices.

Unfortunately, current wireless communication services, as well as conventional wired communication services such as e-mail, voice mail, telephone services, etc., require users to connect to a provider by dialing-in and/or accessing a network before information can be retrieved. This is a problem because users often cannot regularly check for new messages and information and therefore often retrieve time-sensitive information too late.

The above-described problem has been partially remedied by wireless communication services that automatically "push" information to users rather than requiring the users to "pull" the information from a provider. However, such push communication services still require the users to be connected to a service provider to be able to use and act upon the information. Once the users go off-network or off-line, the information cannot be used and/or acted upon. Moreover, existing push types of communication services can only push short messages and are therefore not robust enough for many business applications that require more extensive messages and data to be pushed to users.

SUMMARY OF THE INVENTION

The present invention solves the above-described problems and provides a distinct advance in the art of communication methods. More particularly, the present invention provides a method and system for pushing information to personal computing and communication devices operated by users in such a way that the users can use and/or act upon the information even when the users are off-network or off-line. The present invention also provides a method and system for automatically "provisioning" personal computing and communication devices so that the devices may be used to act upon the information that is pushed to the devices.

One preferred embodiment of the present invention is implemented with a computer network that is coupled with at least one wireless communication service provider. The computer network is operated by an administrator or provider that offers push message and information delivery services in accordance with the present invention. Senders of messages and other information may access the computer network and provide information destined for a recipient. The computer network then conditions the information and stores the information in a queue until a computing and communication device operated by the recipient is in communication with a corresponding wireless communication service provider. The computer network then automatically pushes the information to the device once it is in communication with the service provider and automatically loads the information into appropriate databases and/or programs in the device. The device thus receives necessary information without requiring the recipient to request the information or to enter or load the information into the appropriate program or database residing on the device.

The computer network may also provision devices by automatically loading and assembling software applications in the devices wirelessly without input or configuration from users of the device. For example, in one embodiment of the invention, the computer network may push information to a device operated by a recipient as described above. The device may then determine that it does not have the necessary applications and/or software versions to process the information and thus automatically transmits a wireless message back to the computer network with an indication of what applications and/or software versions need to be sent to the device. The computer network then automatically pushes any additional necessary software to the device. This allows all information and necessary programs to be seamlessly pushed to a device without requiring the user of the device to determine which programs are necessary to run the information, request the information, or to load the information and programs into the device.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The present invention can be implemented in hardware, software, firmware, or a combination thereof. In a preferred embodiment, however, the invention is implemented with one or more computer programs that operate computer and communications equipment broadly referred to by the numeral 10 in FIG. 1. The computer and communications equipment 10 includes a computer network 12, a computer network 14, a wireless communication service provider network 16, and a plurality of computer and communication devices 18. The computer program and equipment 10 illustrated and described herein are merely examples of programs and equipment that may be used to implement preferred embodiments of the present invention and may be replaced with other software and computer equipment without departing from the scope of the present invention.

The computer network 12 is preferably operated by an administrator or provider of the services of the present invention and may include a variety of different conventional computing equipment. In one preferred embodiment of the present invention illustrated in FIG. 2, the computer network includes a server gateway computer 20, a web server computer 22, and a communications server 24. Each of the computers 20, 22, 24 may be any computing device such as a network computer running Windows NT, Novell Netware, Unix, or any other network operating system. The computers are preferably coupled to one another and to other equipment such as various databases 26 and computers or terminals 28 by a wireless area network 30 or other conventional network. The web server computer 22 may also be coupled with a hub 32, a firewall 34, another hub 36, and a router 38. The web server computer 22 also includes conventional web hosting operating software, an Internet connection such as a modem, DSL converter or ISDN converter, and is assigned a URL and corresponding domain name so that the web server computer can be accessed via the Internet in a conventional manner.

Figure 1:
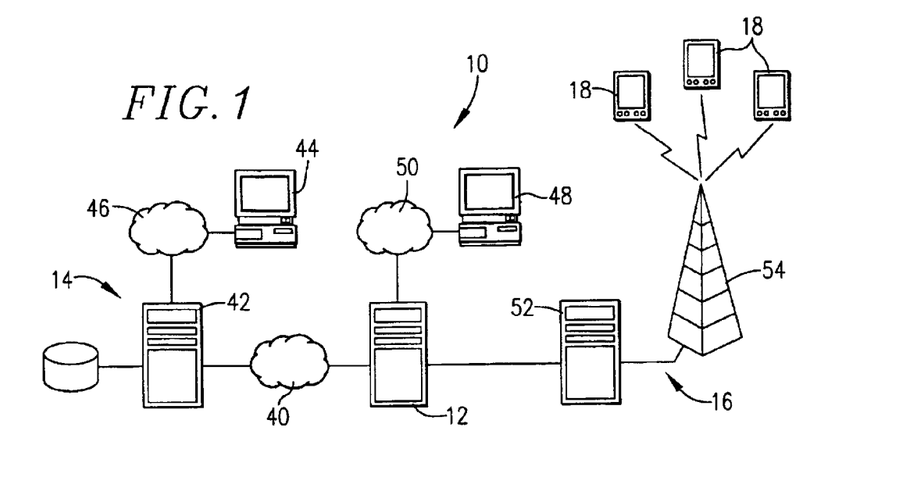
FIG. 1 is a schematic diagram depicting computer and communications equipment that may be used to implement certain aspects of the present invention.
Figure 2:
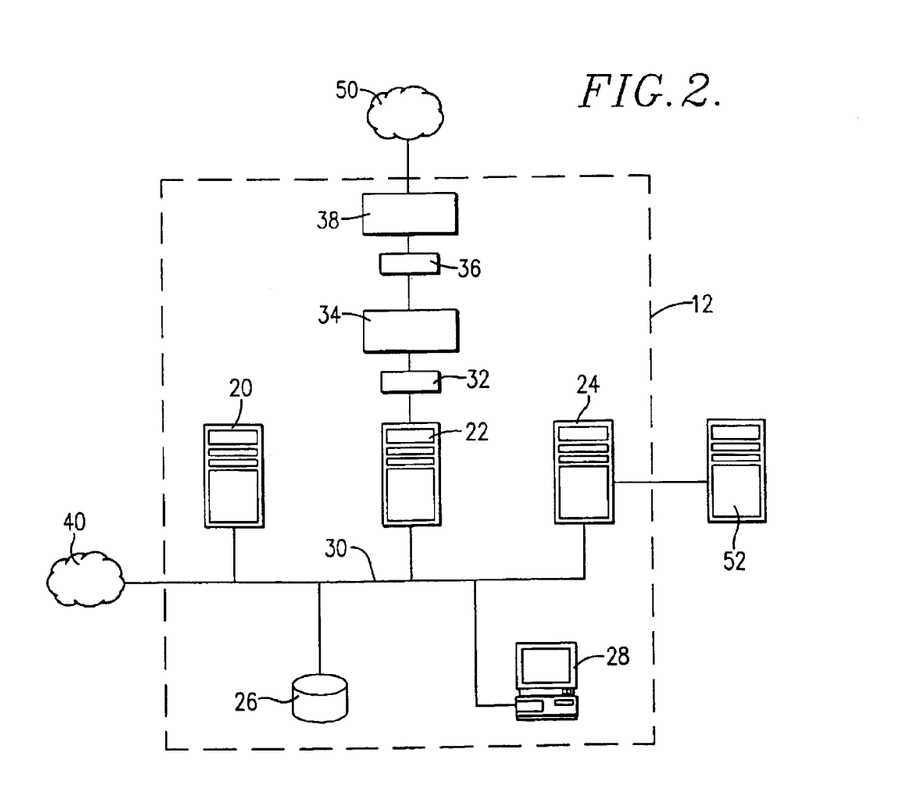
FIG. 2 is a schematic diagram depicting certain of the components of FIG. 1 in more detail.

The computer network 14 represents any number of computer systems that may be operated by persons or entities wishing to send messages and other information to recipients and may include any types of conventional computer equipment. In one preferred embodiment, each computer network 14 is coupled with the computer network 12 via a frame relay or VPN connection 40 and includes one or more server computers 42 and one or more personal computers 44 that may access the server computer 42 via a communications network 46 such as the Internet. In another embodiment of the invention, senders of messages and other information may also access the web server computer 22 of the computer network 12 with one or more personal computers 48 via the Internet 50.

The wireless communications network 16 represents any number of conventional wireless communication provider networks such as PCS, ReFLEX, Advanced Radio Data Network and cellular networks that may be used to implement certain steps of the present invention. Each wireless network includes various computing equipment broadly referred to by the numeral 52 and a plurality of broadcast antennas 54 that serve different cells or coverage areas.

The computing and communication devices 18 are operated by recipients of messages and other information and preferably are handheld personal digital assistants such as those manufactured and sold by Palm, Handspring, RIM, Symbol, and Kyocera. The computing and communication devices 18 may also be personal or laptop computers such as those manufactured and sold by Dell, Compaq, Gateway, or any other computer manufacturer; intelligent mobile phones; pagers; or even Internet appliances that are specifically designed for accessing the Internet. Each computing device 18 includes wireless communications capabilities so that it can send and receive wireless messages and other information.

The computer programs of the present invention are stored in or on computer-readable medium residing on or accessible by the computer network 12 and the devices 18 for instructing the equipment to operate as described herein. Each computer program preferably comprises an ordered listing of executable instructions for implementing logical functions in the computer network 12 and the devices 18. The computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The computer programs of the present invention preferably include communication and provisioning programs residing on the computer network 12 and communication and provisioning programs as well as custom application programs, form applications, or other interpretive programs residing on each of the devices 18. The functionality and operation of several preferred implementations of these programs are described in more detail below. In this regard, some of the steps discussed below may represent a module segment or portion of code of the computer programs of the present invention which comprises one or more executable instructions for implementing the specified logical function or functions. In some alternative implementations, the functions described may occur out of the order described. For example, two functions described as being in succession may in fact be executed substantially concurrently, or the functions may sometimes be executed in the reverse order depending upon the functionality involved.

In one application of the present invention, the above-described computer and communications equipment 10 and computer programs are used to automatically push dispatch-type information from senders to recipients, request acknowledgment from the recipients, and then transmit task status information from the recipients back to the computer network 12 for delivery to the senders. The senders of the information may include companies such as trucking companies or service companies, and the recipients may include workers of the companies such as truck operators, electricians, plumbers, technicians, or computer service personnel. As used herein, the term "information" is meant to include all types of messages, data, programs, applications, and other information that senders may wish to send to recipients, or vice versa.

A sender that wishes to push information to a recipient first accesses the computer network 12 via one of the computer networks 14 or computers 48 and submits dispatch information to the computer network 12. The dispatch information may include, for example, information relating to a maintenance activity, a load pick-up, a load delivery, or other type of project. Such information may also include task lists, punch lists, parts lists, the address for a pick-up or project start point, the address for a drop-off or project stop point, a date and time for the requested pick-up or drop-off, detailed instructions relating to the tasks to be performed, and other related information. This information may be generated with an Internet-based dispatch application and may involve the use of a database that contains attributes for tracking status information related to the task (i.e. accepted, declined, arrived, finished).

Once the sender submits the above dispatch information to the computer network 12, the computer network 12 conditions or processes the information so that it may be delivered to the intended recipient. The computer network 12 does so by first creating a unique message ID number for the information that is to be sent. The computer network 12 then records the information in a recovery log using the message ID so that it may be later recovered. The information is then moved to a queue in the computer network 12 and stored based on the message type and assigned certain tracking information such as a process code, a format code, and a version number.

The computer network 12 may at this point convert the information to transmittable strings in a compressed, binary, or encrypted mode. The information is then parsed into a series of message packets and then moved to a packet queue. The message packets are next sent from the packet queue to a communication thread of a wireless communication service provider 16 which serves the device 18 for which the information is destined. When the provider 16 acknowledges receipt of the message packets, the computer network 12 updates the status of the information in the recovery log. A record for the information is then moved to a transaction log for record-keeping purposes. Finally, the message packets are delivered to a queue operated by the wireless service provider 16.

The wireless service provider 16 then delivers the message packets to the nearest transmission tower 54 according to the last known position of the device 18 as listed in a home location register (HLR) or visiting location register (VLR) accessible by the provider. Once the device 18 is in range and in communication with the wireless service provider, the message packets are broadcast to the device in a conventional manner.

A communication layer on the device 18 receives and stores the message packets in a packet queue, turns on the device, and activates a communication program residing on the device 18 and configured in accordance with one aspect of the present invention. The communication program processes the message packets by stripping the header from each packet, concatenating the packets in sequence order, converting the strings of information from transmittable strings to the appropriate format for the program or application that will access or run the information (i.e. compressed, binary, or encrypted mode), and inserting the message number, message description, message category, and date into a message manager database. The communication program 18 also runs error tests to ensure integrity of the information, and deletes the packets from the packet queue if the information was received error-free. The communication program then automatically loads the information into the appropriate program or application residing on the device 18 so that the information can be acted upon by the user of the device 18.

A custom dispatch application on the device 18 then receives the message string from the communication program, sounds an alert if the information is marked as urgent, and displays the dispatch information so that the user of the device 18 may accept, decline, or otherwise comment on the dispatch information. Once the recipient accepts or declines, the dispatch application composes an automatic feedback message that is to be transmitted to the computer network 12. The feedback message is then passed to the communication program residing on the device 18.

The communication program residing on the device 18 then processes the feedback message by assigning a message key to the message (if needed), counting the characters in the message, and determining the number of packets required to transmit it. Configuration parameters pertinent to the device 18, the wireless service provider 16, and the computer network 12 are stored on the device 18 in a configuration file to determine optimal packet sizes. The communication program then builds packet headers from the message number and packet sequence numbers and splits the message into a number of packets. The packet headers are then concatenated onto the front of each packet, and the packets are moved to an outgoing queue.

The communication layer on the device 18 then receives and stores the message packets and prepares the device 18 to transmit the packets. The packets are transmitted from the device 18 to the nearest tower 54, which then confirms receipt of the packets. Specifically, the wireless service provider 16 receives the message packets, recognizes the packet identifier and/or address, acknowledges receipt, and moves the message packets to a corresponding queue residing in the computer network 12.

The computer network 12 next processes the incoming feedback message by creating a unique message ID number if the message does not have an existing message ID and then recording the message packets with the message ID in the recovery log. The message packets are then moved to a queue based on the message type. These packets are processed by removing packet headers and concatenating into a single message string in sequence order. The message string is then converted from transmittable characters into appropriate compressed, binary, or encrypted strings. The status of the message in the log is then updated. Finally, the message record is moved to a transaction log for record-keeping and the message string is transmitted to a queue on the sender's computer equipment 14 or 48.

The sender's computer equipment 14 or 48 receives the message from the computer network 12 and acknowledges acceptance. The information is then stored as a record in a task status database associated with the dispatch assignment. Dispatchers may then access the task status database to evaluate which tasks have been assigned, accepted, or declined.

In another application of the present invention, the above-described computer and communications equipment 10 and computer programs are used to automatically provision the devices 18 by sending software upgrades, new applications or programs, or other large binary objects to the devices 18. This allows users of the devices 18 to act upon information that is pushed to the devices 18 even if the devices 18 do not have all necessary applications and/or software.

For example, in one embodiment of the invention, the computer network may push information to a device operated by a recipient as described above. The device may then determine from the information what applications and/or software is needed to act upon the information. The device then automatically generates and transmits a wireless message back to the computer network with an indication of what applications and/or software are needed. The computer network then automatically pushes any necessary software to the device. This allows all information and necessary programs to be seamlessly pushed to a device without requiring the user of then device to determine which programs are necessary to run the information, request the information, or load the information and programs into the device.

For this application, the computer network 12 includes a library that can be populated with various binary objects such as the software upgrades, applications, and other items discussed above. This library also preferably includes a distribution list that lists all recipients that have received each object, a description of each object, a final assembled size of each object, a check sum benchmark to confirm that each object has been assembled in the correct sequence, and a binary copy of each object. Attributes for tracking which recipients have acknowledged receipt of an object may also be stored in or alongside the library.

An object that is to be sent to a device 18 is first passed to the gateway computer 20. The gateway computer 20 then conditions or processes the object so that it may be more easily delivered to the intended recipient. The computer network 12 does so by first creating a unique message ID number for the object. The computer network 12 then records the object in a recovery log using the message ID so that it may be later recovered. The object is then moved to a queue in the computer network 12 and stored based on the message type and assigned certain tracking information such as a process code, a format code, and a version number.

The computer network 12 may at this point convert the object to transmittable strings in a compressed, binary, or encrypted mode. The object is then parsed into a series of message packets and then moved to a packet queue. The message packets are next sent from the packet queue to a communication thread of a wireless communication service provider 16 which serves the device 18 for which the object is destined. When the provider 16 acknowledges receipt of the message packets, the computer network 12 updates the status of the information in the recovery log. A record for the object is then moved to a transaction log for record-keeping purposes. Finally, the message packets are delivered to a queue operated by the wireless service provider 16.

The wireless service provider 16 then delivers the message packets to the nearest transmission tower 54 according to the last known position of the device 18 as listed in an HLR or VLR. Once the device 18 is in range and in communication with the wireless service provider, the message packets are broadcast to the device in a conventional manner.

A communication layer on the device 18 receives and stores the message packets in a packet queue, turns on the device, and activates a communication program residing on the device 18 and configured in accordance with one aspect of the present invention. The communication program processes the message packets by stripping the header from each packet, concatenating the packets in sequence order, converting the strings of information from transmittable strings to the appropriate format for the object, and inserting the message number, message description, message category, and date into a message manager database. The communication program 18 also runs error tests to ensure integrity of the object, and deletes the packets from the packet queue if the object was received error-free.

The communication program passes the assembled object to a provisioning program residing on the device 18. The provisioning program then loads the object string from the communication program and proceeds to assemble and test the object based on certain header information including the check sum for the assembled object, the size of the assembled object, and the creator ID assigned to the object. Once the object has been assembled and confirmed, the provisioning program installs the object on the device and creates a feedback message indicating that the installation has been successful. The feedback message is then transferred to the communication program residing on the device 18.

The communication program processes the feedback message by assigning a message key to the message (if needed), counting the characters in the message, and determining the number of packets required to transmit it. Configuration parameters pertinent to the device 18, the wireless service provider 16, and the computer network 12 are stored on the device 18 in a configuration file to determine optimal packet sizes. The communication program then builds packet headers from the message number and packet sequence numbers and splits the message into a number of packets. The packet headers are then concatenated onto the front of each packet, and the packets are moved to an outgoing queue.

The communication layer then receives and stores the message packets and prepares the device 18 to transmit the packets. The packets are transmitted from the device 18 to the nearest tower 54, which then confirms receipt of the packets. Specifically, the wireless service provider 16 receives the message packets, recognizes the packet identifier and/or address, acknowledges receipt, and moves the message packets to a corresponding queue residing in the computer network 12.

The computer network 12 next processes the incoming feedback message by creating a unique message ID number if the message does not have an existing message ID and then recording the message packets with the message ID in the recovery log. The message packets are then moved to a queue based on the message type and then concatenated into a single message string. The message string is then converted from transmittable characters into appropriate compressed, binary, or encrypted strings. The status of the message in the log is then updated. Finally, the message record is moved to a transaction log for record-keeping and the message string is transmitted to a queue on the sender's computer equipment 14 or 48.

The sender's computer equipment 14 or 48 receives the message from the computer network 12 and acknowledges receipt. Administrators may then access the computer network 12 and see which recipients have received a new object by viewing web pages that access records in the computer network 12.

In another application of the present invention, the above-described computer and communications equipment 10 and computer programs may be used to automatically push calendar information to the devices 18. The calendar information may include, for example, meeting dates, travel schedules, deadlines, etc.

A sender that wishes to push such calendar information to a recipient first accesses the computer network 12 via one of the computer networks 14 or computers 48 and submits the information to the computer network 12. The computer network 12 then conditions or processes the information so that it may be delivered to the intended recipient. The computer network 12 does so by first creating a unique message ID number for the information. The computer network 12 then records the information in a recovery log using the message ID so that it may be later recovered. The information is then moved to a queue in the computer network 12 and stored based on the message type and assigned certain tracking information such as a process code, a format code, and a version number.

The computer network 12 may at this point convert the information to transmittable strings in a compressed, binary, or encrypted mode. The information is then parsed into a series of message packets and then moved to a packet queue. The message packets are next sent from the packet queue to a communication thread of a wireless communication service provider 16 which serves the device 18 for which the information is destined. When the provider 16 acknowledges receipt of the message packets, the computer network 12 updates the status of the information in the recovery log. A record for the information is then moved to a transaction log for record-keeping purposes. Finally, the message packets are delivered to a queue operated by the wireless service provider 16.

The wireless service provider 16 then delivers the message packets to the nearest transmission tower 54 according to the last known position of the device 18 as listed in an HLR or VLR. Once the device 18 is in range and in communication with the wireless service provider, the message packets are broadcast to the device in a conventional manner.

A communication layer on the device 18 receives and stores the message packets in a packet queue, turns on the device, and activates a communication program residing on the device 18 and configured in accordance with one aspect of the present invention. The communication program processes the message packets by stripping the header from each packet, concatenating the packets in sequence order, converting the strings of information from transmittable strings to the appropriate format for the program or application that will access or run the information (i.e. compressed, binary, or encrypted mode), and inserting the message number, message description, message category, and date into a message manager database. The communication program 18 also runs error tests to ensure integrity of the information, and deletes the packets from the packet queue if the information was received error-free. The communication program then automatically loads the information into the appropriate program or application residing on the device 18 so that the information can be acted upon by the user of the device 18.

A custom calender or scheduling application on the device 18 then receives the message string from the communication program, sounds an alert if the information is marked as urgent, and displays the information so that the user of the device 18 may act upon it. The user may, for example, review proposed meeting dates and times and either accept or decline the proposed times or press a button labeled "Later." Pressing the Later button causes the display screen to delay requesting this information until the next time the device is turned on. If the recipient accepts or declines, the calender application adds the event to a scheduling program and composes an automatic feedback message that is to be transmitted to the computer network 12. The feedback message is then passed to the communication program residing on the device 18.

The communication program residing on the device 18 then processes the feedback message by assigning a message key to the message (if needed), counting the characters in the message, and determining the number of packets required to transmit it. Configuration parameters pertinent to the device 18, the wireless service provider 16, and the computer network 12 are stored on the device 18 in a configuration file to determine optimal packet sizes. The communication program then builds packet headers from the message number and packet sequence numbers and splits the message into a number of packets. The packet headers are then concatenated onto the front of each packet, and the packets are moved to an outgoing queue.

The communication layer on the device 18 then receives and stores the message packets and prepares the device 18 to transmit the packets. The packets are transmitted from the device 18 to the nearest tower 54, which then confirms receipt of the packets. Specifically, the wireless service provider 16 receives the message packets, recognizes the packet identifier and/or address, acknowledges receipt, and moves the message packets to a corresponding queue residing in the computer network 12.

The computer network 12 next processes the incoming feedback message by creating a unique message ID number if the message does not have an existing message ID and then recording the message packets with the message ID in the recovery log. The message packets are then moved to a queue based on the message type and then concatenated into a single message string. The message string is then converted from transmittable characters into appropriate compressed, binary, or encrypted strings. The status of the message in the log is then updated. Finally, the message record is moved to a transaction log for record-keeping and the message string is transmitted to a queue on the sender's computer equipment 14 or 48.

A scheduling program on the sender's computer equipment 14 or 48 receives the message from the computer network 12 and acknowledges acceptance of the proposed meeting or other event. The information is then stored as a record in a calendering database. Administrators can then access the calendering database to see which recipients have accepted the proposed meeting date.

In another application of the present invention, the above-described computer and communications equipment 10 and computer programs may be used to automatically send to one or more of the devices 18 a request for data matching a particular criteria. The device then fills the request and sends the results back to the computer network 12 for delivery to the requester of the data.

A sender that wishes to request such a data search first accesses the computer network 12 via one of the computer networks 14 or computers 48 and identifies the search criteria and the devices to be searched. The search criteria may be generated with any known data search program or application.

Once the sender submits the above search information to the computer network 12, the computer network 12 conditions or processes the information so that it may be delivered to the intended recipient. The computer network 12 does so by first creating a unique message ID number for the information that is to be sent. The computer network 12 then records the information in a recovery log using the message ID so that it may be later recovered. The information is then moved to a queue in the computer network 12 and stored based on the message type and assigned certain tracking information such as a process code, a format code, and a version number.

The computer network 12 may at this point convert the information to transmittable strings in a compressed, binary, or encrypted mode. The information is then parsed into a series of message packets and then moved to a packet queue. The message packets are next sent from the packet queue to a communication thread of a wireless communication service provider 16 which serves the device 18 for which the information is destined. When the provider 16 acknowledges receipt of the message packets, the computer network 12 updates the status of the information in the recovery log. A record for the information is then moved to a transaction log for record-keeping purposes. Finally, the message packets are delivered to a queue operated by the wireless service provider 16.

The wireless service provider 16 then delivers the message packets to the nearest transmission tower 54 according to the last known position of the device 18 as listed in an HLR or VLR. Once the device 18 is in range and in communication with the wireless service provider, the message packets are broadcast to the device in a conventional manner.

A communication layer on the device 18 receives and stores the message packets in a packet queue, turns on the device, and activates a communication program residing on the device 18 and configured in accordance with one aspect of the present invention. The communication program processes the message packets by stripping the header from each packet, concatenating the packets in sequence order, converting the strings of information from transmittable strings to the appropriate format for the program or application that will access or run the information (i.e. compressed, binary, or encrypted mode), and inserting the message number, message description, message category, and date into a message manager database. The communication program 18 also runs error tests to ensure integrity of the information, and deletes the packets from the packet queue if the information was received error-free. The communication program then automatically loads the information into a custom search application residing on the device 18 so that the information can be acted upon by the user of the device 18.

The custom search application on the device 18 then receives the message string from the communication program and initiates a series of find operations on the device to locate all records matching the search criteria. Once the records have been identified, the results are collected and formatted to be transmitted to the computer network 12. The results are then passed to the communication program residing on the device 18.

The communication program then processes the results by assigning a message key to the message (if needed), counting the characters in the message, and determining the number of packets required to transmit it. Configuration parameters pertinent to the device 18, the wireless service provider 16, and the computer network 12 are stored on the device 18 in a configuration file to determine optimal packet sizes. The communication program then builds packet headers from the message number and packet sequence numbers and splits the message into a number of packets. The packet headers are then concatenated onto the front of each packet, and the packets are moved to an outgoing queue.

The communication layer on the device 18 then receives and stores the message packets and prepares the device 18 to transmit the packets. The packets are transmitted from the device 18 to the nearest tower 54, which then confirms receipt of the packets. Specifically, the wireless service provider 16 receives the message packets, recognizes the packet identifier and/or address, acknowledges receipt, and moves the message packets to a corresponding queue residing in the computer network 12.

The computer network 12 next processes the incoming results by creating a unique message ID number if the message does not have an existing message ID and then recording the message packets with the message ID in the recovery log. The message packets are then moved to a queue based on the message type and then concatenated into a single message string. The message string is then converted from transmittable characters into appropriate compressed, binary, or encrypted strings. The status of the message in the log is then updated. Finally, the message record is moved to a transaction log for record-keeping and the message string is transmitted to a queue on the sender's computer equipment 14 or 48.

The sender's computer equipment 14 or 48 receives the results from the computer network 12 and acknowledges acceptance. An information requestor may then access the results to determine what records or data were found that meet the criteria. Alternatively, the above-described data search can be initiated by one of the devices 18 and the results can be sent to the requesting device.

In another application of the present invention, the above-described computer and communications equipment 10 and computer programs may be used to automatically request location information from multiples devices 18 and determine which device 18 is closest to a particular location. Such information may be used for dispatching mobile units to assignments based on location information for the mobile units.

A sender that wishes to push location information to a recipient first accesses the computer network 12 via one of the computer networks 14 or computers 48 and submits such information to the computer network 12. The location information may be generated with any known dispatch application and may also include project information such as an address for a project and a scheduled date and time. The location information requested from the devices 18 is preferably GPS location coordinates generated from GPS receivers located on the devices 18.

Once the sender submits the above location information to the computer network 12, the computer network 12 conditions or processes the information so that it may be delivered to the intended recipient. The computer network 12 does so by first creating a unique message ID number for the information that is to be sent. The computer network 12 then records the information in a recovery log using the message ID so that it may be later recovered. The information is then moved to a queue in the computer network 12 and stored based on the message type and assigned certain tracking information such as a process code, a format code, and a version number.

The computer network 12 may at this point convert the information to transmittable strings in a compressed, binary, or encrypted mode. The information is then parsed into a series of message packets and then moved to a packet queue. The message packets are next sent from the packet queue to a communication thread of a wireless communication service provider 16 which serves the device 18 for which the information is destined. When the provider 16 acknowledges receipt of the message packets, the computer network 12 updates the status of the information in the recovery log. A record for the information is then moved to a transaction log for record-keeping purposes. Finally, the message packets are delivered to a queue operated by the wireless service provider 16.

The wireless service provider 16 then delivers the message packets to the nearest transmission tower 54 according to the last known position of the device 18 as listed in an HLR or VLR. Once the device 18 is in range and in communication with the wireless service provider, the message packets are broadcast to the device in a conventional manner.

A communication layer on the device 18 receives and stores the message packets in a packet queue, turns on the device, and activates a communication program residing on the device 18 and configured in accordance with one aspect of the present invention. The communication program processes the message packets by stripping the header from each packet, concatenating the packets in sequence order, converting the strings of information from transmittable strings to the appropriate format for the program or application that will access or run the information. (i.e. compressed, binary, or encrypted mode), and inserting the message number, message description, message category, and date into a message manager database. The communication program 18 also runs error tests to ensure integrity of the information, and deletes the packets from the packet queue if the information was received error-free. The communication program then automatically loads the information into the appropriate program or application residing on the device 18 so that the information can be acted upon by the device 18.

A custom location application on the device 18 then receives the message string from the communication program. The location application then polls a GPS receiver on or coupled with the device 18 through a location communication port. The GPS receiver provides response by providing GPS coordinate readings. The location application formats the GPS coordinates into an automatic feedback message to be sent back to the computer network 12. The feedback message is then passed to the communication program residing on the device 18.

The communication program residing on the device 18 then processes the feedback message by assigning a message key to the message (if needed), counting the characters in the message, and determining the number of packets required to transmit it. Configuration parameters pertinent to the device 18, the wireless service provider 16, and the computer network 12 are stored on the device 18 in a configuration file to determine optimal packet sizes. The communication program then builds packet headers from the message number and packet sequence numbers and splits the message into a number of packets. The packet headers are then concatenated onto the front of each packet, and the packets are moved to an outgoing queue.

The communication layer on the device 18 then receives and stores the message packets and prepares the device 18 to transmit the packets. The packets are transmitted from the device 18 to the nearest tower 54, which then confirms receipt of the packets. Specifically, the wireless service provider 16 receives the message packets, recognizes the packet identifier and/or address, acknowledges receipt, and moves the message packets to a corresponding queue residing in the computer network 12.

The computer network 12 next processes the incoming feedback message by creating a unique message ID number if the message does not have an existing message ID and then recording the message packets with the message ID in the recovery log. The message packets are then moved to a queue based on the message type and then concatenated into a single message string. The message string is then converted from transmittable characters into appropriate compressed, binary, or encrypted strings. The status of the message in the log is then updated. Finally, the message record is moved to a transaction log for record-keeping and the message string is transmitted to a queue on the sender's computer equipment 14 or 48.

The sender's computer equipment 14 or 48 receives the message from the computer network 12 and acknowledges acceptance. A proximity application on the sender's computer equipment 14 or 48 then reviews all the responses from multiple devices 18 and estimates the distance that each device is from the target location. The nearest device 18 can then be dispatched as described in the dispatch application above.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by letters patent includes the following:

What is claimed is:

1. A method of wirelessly delivering information comprising the steps of:

receiving information from a sender that is destined for a recipient;

conditioning the information so that it can be more easily delivered to the recipient;

storing the information in a queue until a computing and communication device operated by the recipient is in communication with a wireless communication service provider; and provisioning the computing and communication device by pushing the information as well as all applications needed to act upon the information to the computing and communication device when the computing and communication device is in communication with the wireless communication service provider so that the recipient may continue to use the information even when the computing and communication device is no longer in communication with the wireless communication service provider.

2. The method as set forth in claim 1, the provisioning step further including the steps of:

receiving from the computing and communication device an indication of what applications are needed to act upon the information; and pushing to the computer and communication device the applications.

3. The method as set forth in claim 1, the information including at least one of the following: dispatch information, calender information, search request, location information software, and software upgrades.

4. The method as set forth in claim 1, the computing and communication device including one of the following: a personal digital assistant, a personal computer, a laptop computer, and an intelligent wireless phone.

5. The method as set forth in claim 1, wherein the sender is a company wishing to deliver information to employees, suppliers, or customers.

6. The method as set forth in claim 5, wherein the recipient is an employee, supplier or customer of the company.

7. The method as set forth in claim 1, the provisioning step further including the step of automatically loading the information into appropriate software applications on the computing and communication device.

8. The method as set forth in claim 1, the conditioning step including the steps of:

creating a unique ID number for the information;

converting the information to transmittable strings of data; and parsing the information into a series of message packets.

9. A computer system for wirelessly delivering information, the system being operable to:

receive information from a sender that is destined for a recipient;

condition the information so that it can be more easily delivered to the recipient;

store the information in a queue until a computing and communication device operated by the recipient is in communication with a wireless communication service provider; and provision the computing and communication device by pushing the information as well as all applications needed to act upon the information to the computing and communication device when the computing and communication device is in communication with the wireless communication service provider so that the recipient may continue to use the information even when the computing and communication device is no longer in communication with the wireless communication service provider.

10. The system as set forth in claim 9, the system being further operable to:

receive from the computing and communication device an indication of what applications are needed to act upon the information; and push to the computer and communication device the applications.

11. The system as set forth in claim 9, the information including at least one of the following: dispatch information, calender information, search request, location information software, and software upgrades.

12. The system as set forth in claim 9, the computing and communication device including one of the following: a personal digital assistant, a personal computer, a laptop computer, and an intelligent wireless phone.

13. The system as set forth in claim 9, wherein the sender is a company wishing to deliver information to employees, suppliers, or customers.

14. The system as set forth in claim 13, wherein the recipient is an employee, supplier or customer of the company.

15. The system as set forth in claim 9, the system being further operable to automatically load the information into appropriate software applications on the computing and communication device.

16. The system as set forth in claim 9, the system being further operable to:

create a unique ID number for the information;

convert the information to transmittable strings of data; and parse the information into a series of message packets.

17. A method of wirelessly delivering information comprising the steps of:

receiving information from a sending computing device that is destined for a computing and communication device operated by a recipient;

conditioning the information so that it can be more easily delivered to the recipient;

sending the information to a wireless communication service provider that is capable of communication with the computing and communication device operated by the recipient; and provisioning the computing and communications device by pushing the information as well as all applications needed to act upon the information to the computing and communications device when the computing and communications device is in communication with the wireless communication service provider so that the recipient may continue to use the information even when the computing and communications device is no longer in communication with the wireless communication service provider.

18. The method as set forth in claim 17, the provisioning step further including the steps of:

receiving from the computing and communications device an indication of what applications are needed to act upon the information; and pushing the applications to the computing and communications device.

19. A computer system for wirelessly delivering information, the system being operable to:

receive information from a sending computing device that is destined for a computing and communication device operated by a recipient;

conditioning the information so that it can be more easily delivered to the recipient;

sending the information to a wireless communication service provider that is capable of communication with the computing and communication device operated by the recipient; and provisioning the computing and communications device by pushing the information as well as all applications needed to act upon the information to the computing and communications device when the computing and communications device is in communication with the wireless communication service provider so that the recipient may continue to use the information even when the computing and communications device is no longer in communication with the wireless communication service provider.

20. The system as set forth in claim 19, the system being further operable to:

receive from the computing and communications device an indication of what applications are needed to act upon the information; and push the applications to the computing and communications device.

21. The method as set forth in claim 1, the information including at least one of the following: calender information, search request, location information software, and software upgrades.

22. The system as set forth in claim 9, the information including at least one of the following: calender information, search request, location information software, and software upgrades.

23. A method of wirelessly delivering information comprising the steps of:

receiving information from a sending computing device that is destined for a computing and communication device operated by a recipient;

sending the information to the computing and communication device through a terrestrial-based wireless communication service provider;

automatically determining in the computing and communication device what applications are needed to act upon the information, without intervention by the recipient, without intervention by the sending computing device, and without intervention by the service provider;

receiving from the computing and communications device an indication of what applications are needed to act upon the information; and pushing the applications needed to act upon the information, as determined by the computing and communications device, to the computing and communications device through the service provider.

24. The method as set forth in claim 23, further including the step of conditioning the information so that it can be more easily delivered to the recipient.

25. The method as set forth in claim 23, wherein the wireless communication service provider operates a network selected from the group consisting of a PCS network, a ReFLEX network, an Advanced Radio Data Network, and a cellular network.

26. The method as set forth in claim 23, wherein the computing and communications device is selected from the group consisting of a handheld personal digital assistant, a personal computer, a laptop computer, an intelligent mobile phone, a pager, and an Internet appliance.

* * * * *